United States Patent [19]

Wheeler

[11] Patent Number: 4,691,999
[45] Date of Patent: Sep. 8, 1987

[54] AFOCAL BEAM EXPANSION APPARATUS AND METHOD

[75] Inventor: Bryce A. Wheeler, Los Angeles, Calif.

[73] Assignee: Hughes Aircraft Company, Los Angeles, Calif.

[21] Appl. No.: 848,182

[22] Filed: Apr. 4, 1986

[51] Int. Cl.⁴ .................... G02B 5/10; G02B 17/06; G02B 26/10

[52] U.S. Cl. .................... 350/620; 350/622; 350/486; 350/6.5

[58] Field of Search ............ 350/620, 622, 623, 624, 350/618, 486, 6.5, 6.9, 1.1, 320

[56] References Cited

U.S. PATENT DOCUMENTS 3,917,381 11/1975 Feigih .................... 350/620

FOREIGN PATENT DOCUMENTS 96193 12/1983 European Pat. Off. ........... 350/620

*Primary Examiner*—Jon W. Henry
*Attorney, Agent, or Firm*—Ronald L. Taylor; A. W. Karambelas

[57] ABSTRACT

An afocal beam expansion system and method is described which achieves the compactness of prior art refractive systems and yet avoids the use of refractive elements with their accompanying beam scattering, adsorption and temperature sensitivity. A pointing reflector is positioned in the beam path between an expansion reflector and a collimating reflector. The small diameter input beam is directed onto the expansion reflector, which causes it to diverge, reflects off the pointing reflector, and reaches the collimating reflector. The latter element collimates the beam and reflects it back to the pointing reflector, which points the beam along a desired output axis. The expansion, pointing and collimating reflectors are positioned relative to each other such that the beam axis is altered upon each reflection from each element. The pointing reflector may be implemented as a plano mirror, or alternately may comprise a convex reflective surface that cooperates with the collimating mirror to fully collimate the expanded beam. The invention is particularly applicable to airborne laser navigational radar terrain avoidance systems.

12 Claims, 5 Drawing Figures

AFOCAL BEAM EXPANSION APPARATUS AND METHOD

BACKGROUND OF THE INVENTION

1. Field of the Invention

This invention relates to beam expanders, and more particularly to apparatus and methods for expanding and pointing a beam in a desired direction.

2. Description of the Prior Art

Aircraft borne laser radar systems have been developed which are employed as a navigational tool for terrain avoidance. These systems determine the actual range from the aircraft to ground, compare the actual range with the desired range obtained from a flight log, and adjust the path of the aircraft accordingly.

Laser beams in the far infrared regions are normally used for this purpose. The beam is typically generated with a relatively small diameter, perhaps 2-3 cm., in an orientation normal to and centered upon an exit window. The cross-sectional area of the beam must be expanded prior to transmission through the window, typically by a factor of about 20, and the beam axis must be tilted so that it exits the window at a positive angle to the normal. This prevents a "narcissus" effect, or a scattering of energy back into the beam from the window. The entire beam processing apparatus is rotated in continuous steps of 120° each, enabling the beam to scan the terrain and obtain a range for each 120° increment. The received echo signal at each increment has a 90° polarization shift relative to the output beam, and is separated from the output beam to determine the range.

The beam expansion apparatus must be afocal, that is, the output beam produced by the expansion must be collimated as is the smaller input beam. It is generally desirable that the expansion apparatus employ reflective rather than refractive elements, because refractive elements produce more beam scattering and hence a lower signal-to-noise ratio and reduced range. Also, refractive elements have to be adjusted to a specific wavelength, whereas reflective elements are wavelength independent within the band of interest. Reflective elements also generally exhibit lower adsorption and lower sensitivity to temperature changes than do refractive elements.

There is a limit to the rate at which the beam can be expanded, since too rapid an expansion will produce beam aberrations that can prevent proper recollimation. Accordingly, it is necessary to reserve a minimum distance over which the beam is expanded in order to maintain geometric quality. Focusing the beam should be avoided to prevent gaseous molecular breakdown that might occur at a focus due to the high laser energy.

Unfortunately, only limited space is available in an aircraft terrain radar system, and it is therefore particularly desirable that the beam expansion apparatus be as compact as possible. Prior art optical systems such as the Dall Kirkham and Mersenne designs are optically satisfactory for laser applications, but are too bulky for practical use in installations requiring compactness and in geometries in which the input beam is normal to and centered upon an exit beam window. In practice, prior beam expanders for this application have had to use refractive elements, with the deficiencies noted above, in order to fit within the required small volumes.

An example of a prior art reflective beam expander is illustrated in FIG. 1. The system includes a convex secondary mirror 2 which receives a small diameter laser beam 4 and reflects the beam onto a concave primary mirror 6. Due to the convexity of secondary mirror 2, the beam angularly diverges in transit from secondary mirror 2 to primary mirror 6; the primary mirror is positioned such that the beam reaches it when the beam is at the desired output cross-section. The beam is collimated by primary mirror 6 and reflected along an axis 8 parallel to the input beam axis. A plano mirror 10 positioned in the beam path just below the level of secondary mirror 2 reflects the expanded beam onto another plano mirror 12, which points the beam along a desired output axis 14. Mirrors 10 and 12 do not alter the collimation of the output beam, but serve merely to orient it so that it passes through an output window 16 at a desired offset angle to the window. This offset angle determines the beam's line of sight.

The expanded beam axis 8 from primary mirror 6 extends through and normal to the center of exit window 16. In order to sweep the beam through 360° rotations, plano mirrors 10 and 12 are contained in a rotatable drum or barrel, indicated by dashed line 18. The barrel rotates about axis 8, thereby sweeping the beam through a 360° rotation for each turn of the barrel.

The beam expansion system illustrated in FIG. 1 expands the beam to the desired size, and adequately maintains its geometric quality. However, the volume occupied by the equipment is excessive for the desired laser radar application.

Another prior art system which is somewhat more compact, and which allows the small diameter input beam to be aligned with the exit window, is illustrated in FIG. 2. A pair of plano mirrors 20 and 22 redirect the input beam to a convex secondary mirror 24 located near the exit window but out of sight of the exit beam. Secondary mirror 24 reflects the mirror towards a concave primary mirror 26, and causes it to angularly diverge so that is reaches its desired cross-section at primary mirror 26. In this respect the distance between the secondary and primary mirrors of the two systems illustrated in FIGS. 1 and 2 are the same. Primary mirror 26, which is located near the top of a rotatable barrel 28, recollimates the beam and points it along a desired output axis 30 which intersects the center of the window. The FIG. 2 apparatus is somewhat less bulky than that of FIG. 1, but is still considerably larger than desirable.

Another approach employing reflective elements is illustrated in FIG. 3. The height of the beam expansion apparatus above the exit window is less in this system than in the designs shown in FIGS. 1 and 2, but its horizontal extent is greater. The small diameter input beam 32 is reflected at right angles by three plano mirrors 34, 36 and 38 to a convex secondary mirror 40 at the lower right hand corner of the system. Secondary mirror 40 expands and directs the beam onto a concave primary mirror 42 such that the beam is at its desired cross-section when it reaches the primary mirror. For this purpose the distance between the secondary and primary mirrors is the same as in the two previously described systems. The primary mirror 42 collimates and redirects the beam along a generally horizontal axis 44 to a large plano mirror 46, which points the beam out exit window 16 along the desired output axis 48. The entire system is included within a rotatable drum 50 that rotates about the coincident axis of input beam 32 and the exit window. The system of FIG. 3 extends a lesser distance away from the exit window than do the two previously described systems, but it rotates through a slightly greater volume than does the system of FIG. 2. Accordingly, it is still too bulky.

A refractive beam expander which achieves the desired small volume is illustrated in FIG. 4. The input beam 52 is directed through an expansion lens 54, which causes the beam to expand at substantially the same rate as in the previously described systems. The axis of input beam 52 is normal to and extends through the center of exit window 16. The expanding beam is redirected by plano mirrors 56 and 58 so that it is pointed along the desired output axis 60 relative to exit window 16. A primary collimating lens 62 is placed in the beam path just above the exit window to collimate the beam prior to exit. The system is enclosed within a rotatable drum 64.

The volume swept by the refractive system of FIG. 4 as it rotates is small enough for practical use in an airborne laser radar system. Compared with the volumes swept by rotation of the previously described reflective systems, with the swept volume of the refractive FIG. 4 system assigned a unit volume of 1.0, the swept volumes of the FIGS. 1, 2 and 3 systems are approximately 4.6, 2.5 and 2.8, respectively. However, the refractive system of FIG. 4 suffers from the scattering, adsorption, bandwidth and temperature sensitivity problems mentioned previously.

SUMMARY OF THE INVENTION

In view of the problems associated with the prior art, the object of the present invention is to provide a novel and improved apparatus and method for afocal beam expansion and pointing which achieves the high beam qualities of prior reflective systems in a compact volume associated with prior refractive systems.

This object is achieved in the present invention by employing a common reflector to accomplish the dual functions of directing the beam during expansion to achieve a sufficiently long expansion distance, and of pointing the expanded and collimated beam along the desired output axis. A small diameter input beam, initially oriented normal to the center of an exit window, is directed onto an expansion reflector which causes the beam to angularly diverge and expand, and also directs the expanding beam onto a pointing reflector. A collimating reflector is positioned to receive the expanding beam reflected from the pointing reflector, to collimate the beam, and to reflect it back to the pointing reflector along an axis different from the axis of the expanding beam between the pointing and expansion reflectors. The pointing reflector is oriented to receive the expanded and collimated beam and to reflect and point it along a desired output axis.

In the preferred embodiment the pointing reflector is a substantially plano mirror, and the expanding beam is substantially fully collimated by the collimating reflector. A series of input reflectors successively reflect the input beam onto the pointing reflector along an axis other than either the input or output axes, with the last input reflector being convex to initiate the beam expansion. One of the input reflectors may be formed integrally with the pointing reflector, or alternately may be implemented separately and made adjustable for boresight alignment. The pointing and collimating reflectors are positioned generally on opposite sides of the input beam axis to minimize space requirements.

These and other objects and features of the invention will be apparent to those skilled in the art from the following detailed description of preferred embodiments, taken together with the accompanying drawings, in which:

DETAILED DESCRIPTION OF PREFERRED EMBODIMENTS

Figure 1:
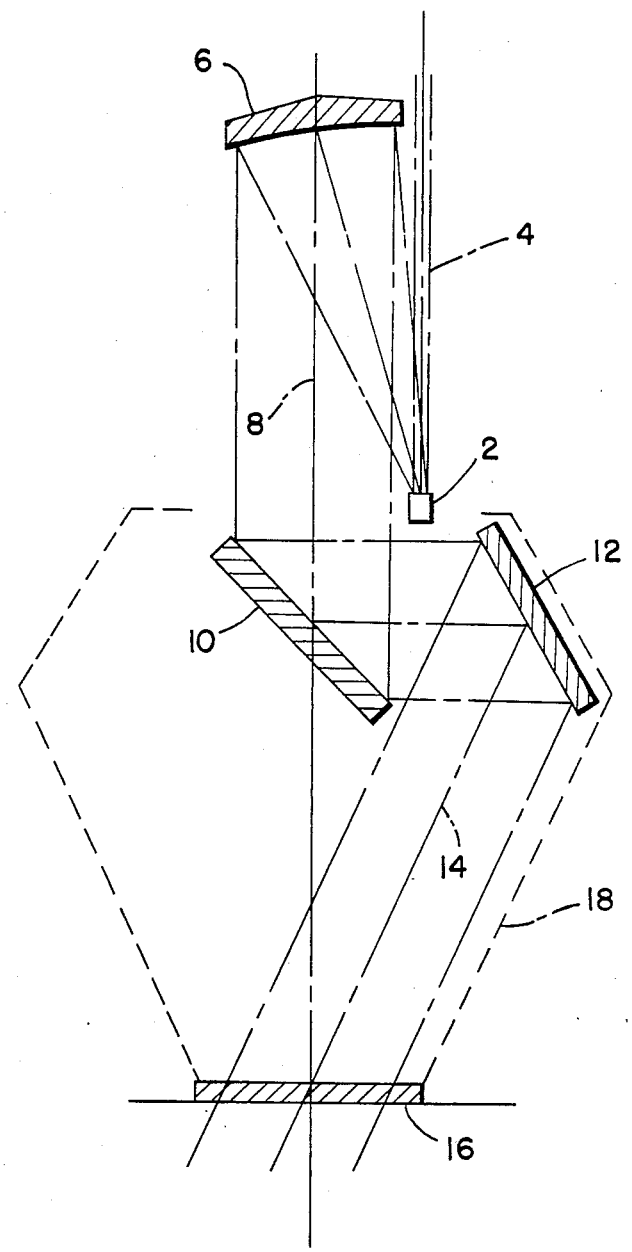
FIGS. 1, 2 and 3 are diagrams of prior art reflective beam expansion systems.
Figure 2:
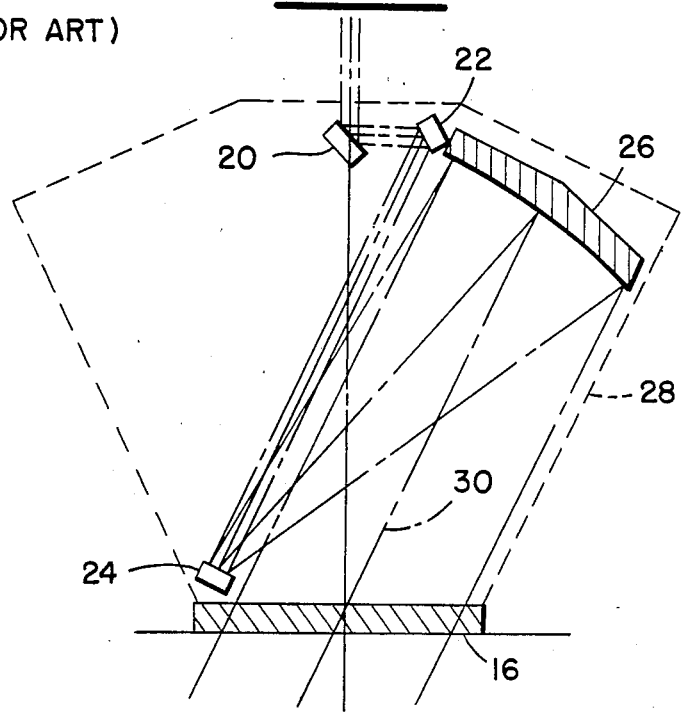
Figure 3:
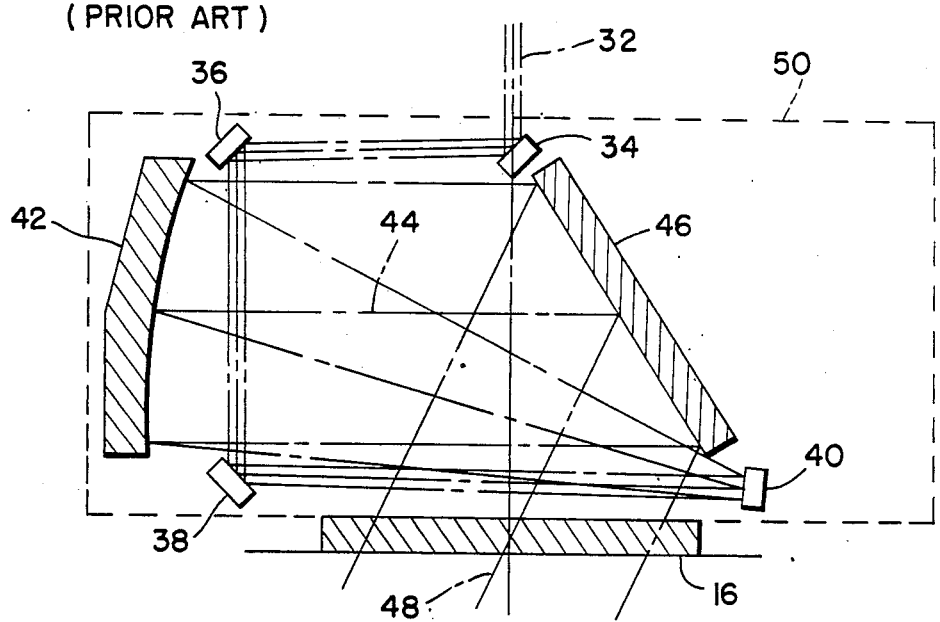
Figure 4:
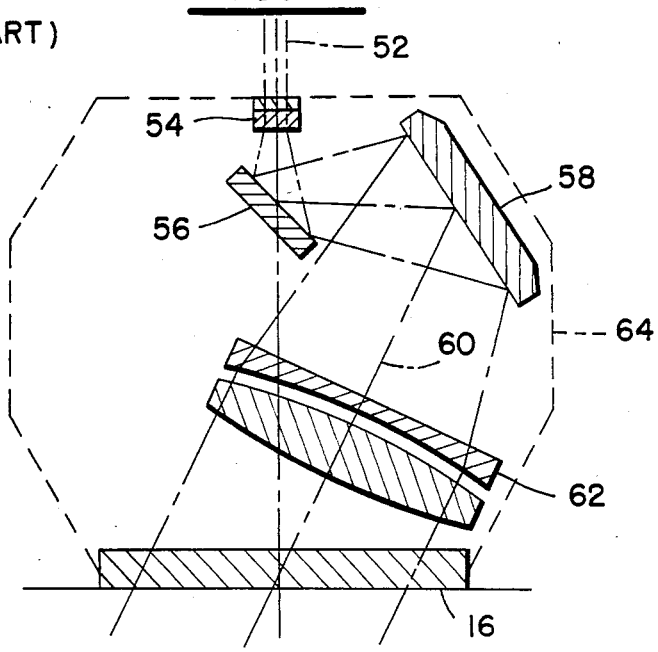
FIG. 4 is a diagram of a prior art refractive beam expansion system.
Figure 5:
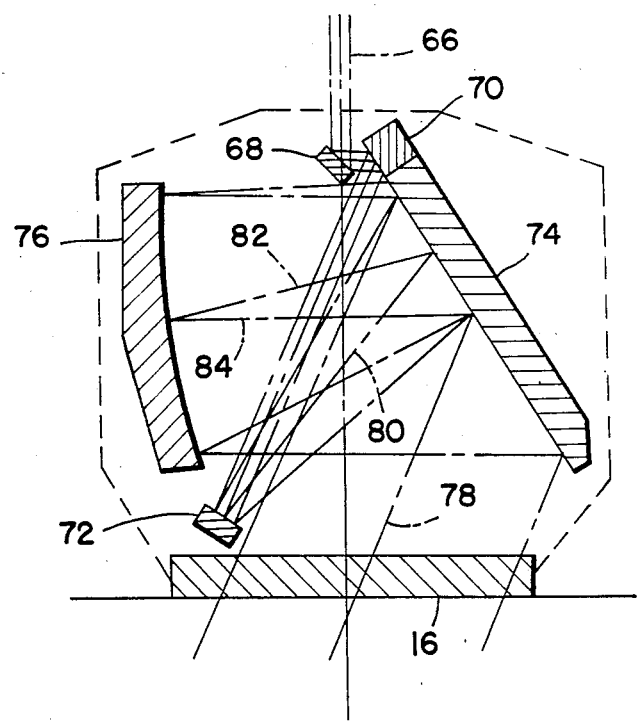
FIG. 5 is a diagram of a reflective beam expansion system in accordance with the present invention.

The beam expansion apparatus of the present invention is illustrated in FIG. 5. A relatively small diameter input laser beam 66 is directed normal to the center of an exit window 16, as in the prior art systems of FIGS. 2-4. However, the system of FIG. 5 employs purely reflective elements in an arrangement which preserves the beam quality of the prior art reflective systems, and yet occupies a swept volume which is approximately the same as that of the prior art refractive system of FIG. 4.

In the illustrated embodiment the input beam 66 is directed successively to three input reflectors 68, 70 and 72. The first input reflector 68 is located in the input beam axis and reflects the beam without changing its collimation to the second input reflector 70. This reflector may comprise a stationary extension of a pointing mirror 74, to be described below, or it may be implemented as a separate reflector with appropriate adjustment means to adjust its angular orientation so as to align the input beam with the boresight of the output beam.

Reflector 70, which is located near the top of the apparatus, preserves the collimation of the input beam and redirects it to the final input mirror 72, which is located on the opposite side of the input beam axis from reflector 70 and just above the exit mirror 16. Reflector 72 is a convex mirror which produces an angular divergence in the input beam reflected off its surface, thus causing the beam to expand as it travels away from expansion mirror 72.

Pointing mirror 74 is a large diameter element located on the opposite side of the input beam axis from expansion mirror 72. The reflective surface of pointing mirror 74 permits the beam to continue expanding after it has been reflected. The pointing mirror is oriented so that it reflects the incoming beam from expansion mirror 72 onto a primary mirror 76 on the opposite side of the input beam axis. The reflective surface of primary mirror 76 is concave, causing the beam to become collimated as it is reflected off the surface. Collimating mirror 76 is positioned to direct the beam back onto pointing mirror 74, which again reflects the beam so as to point it out through exit window 16 along an output axis 78 that extends through the center of the exit window at the desired offset angle.

The relative angular orientations of expansion mirror 72, pointing mirror 74 and collimating mirror 76 are selected such that the beam strikes each mirror at a non-normal angle, and is thus reflected off each mirror at a non-zero angle to the incident beam. The direction of the expanding beam between expansion mirror 72 and pointing mirror 74 is indicated by axis 80; the direction of the still expanding beam between pointing mirror 74 and collimating mirror 76 is indicated by axis 82; and the direction of the collimated beam which is reflected from collimating mirror 76 back to pointing mirror 74 is indicated by axis 84. As illustrated, non of these axes are coincident, thus permitting the beam to be repeatedly redirected until it is finally aligned with output axis 78 after its second reflection off pointing mirror 74. It should be noted that each of the input mirrors 68, 70 and 72 are positioned outside the envelope of the beam as it is being expanded and after recollimation.

Pointing mirror 74 performs a dual function. First, it divides the beam's expansion path into two separate segments, indicated by axes 80 and 82. This eliminates the need for the relatively long separation between the primary and secondary mirrors of the prior art reflective systems, and thus contributes to making the present system more compact. Secondly, pointing mirror 74 points the collimated beam from collimating mirror 76 along the desired output axis. This combination of two functions in a single mirror element also saves space and makes the system additionally compact.

As described thus far pointing mirror 74 has a plano surface, and substantially all of the recollimation from an expanding beam back to a collimated beam is performed by the concave surface of collimating mirror 76. Alternately, the reflective surface of pointing mirror 74 could be made somewhat concave so as to partially collimate the expanding beam received from expansion mirror 72. In this event the convexity of collimating mirror 76 would be relaxed somewhat, whereby the degree of beam expansion is progressively reduced and the beam is progressively collimated as it is first reflected by poinging mirror 74, then by collimating mirror 76 and again by pointing mirror 74. The convexity of both pointing mirror 74 and collimating mirror 76 would be selected such that full collimation is achieved as a cumulative result of a single reflection off mirror 76 and two reflections by mirror 74. In this manner the effective distance over which the beam expands is increased, by the distance between collimating mirror 76 and pointing mirror 74 along axis 84, thereby permitting the use of somewhat smaller beam divergence angles and a possible enhancement of the beam optical qualities.

A compact yet high quality beam expansion and pointing system and method has thus been shown and described. It should be understood that numerous variations and alternate embodiments will occur to those skilled in the art. For example, one or more additional reflecting surfaces could be placed in the beam path between the expansion and collimating mirrors, and thereby possibly contract the size of the apparatus still further, so long as the additional reflecting surfaces do not block the output beam path. Accordingly, it is intended that the invention be limited only in terms of the appended claims.

I claim:

1. A compact expansion and pointing system, comprising:
    a pointing reflector means oriented to receive an incident beam along a predetermined incident axis and to reflect and point the beam along a desired output axis,
    expansion reflector means adapted to receive an input collimated beam, to apply an angular divergence to the input beam so that it's cross-section expands, and to direct the expanding beam onto the pointing reflector means along an axis other than said incident axis, and
    a collimating reflector means positioned to receive the expanding beam reflected from the pointing reflector means and to reflect the beam back to the pointing reflector means along said predetermined incident axis, the collimating reflector means applying a collimation to the expanding beam so that it is reflected by the pointing reflector means along the desired output axis as a substantially collimated beam of greater cross-section than the input beam.

2. The beam expansion and pointing system of claim 1, wherein the pointing reflector means comprises a substantially plano mirror, and the collimating reflector means applies substantially the full collimation to the expanding beam.

3. A compact afocal beam expansion and pointing system, comprising:
    a pointing reflector oriented to receive an incident beam along a predetermined incident axis and to reflect and point the beam along a desired output axis,
    a plurality of input reflectors positioned to receive an input collimated beam along an input axis other than the output axis and to successively reflect the input beam onto the pointing reflector along an axis other than the input or output axes, at least one of the input reflectors applying an angular divergence to the input beam so that its cross-section expands, and
    a concave reflector positioned to receive the expanding beam reflected from the pointing reflector and to reflect the beam back to the pointing reflector along said predetermined incident axis, the concave reflector applying a collimation to the expanding beam so that it is reflected by the pointing reflector along the desired output axis as a substantially collimated beam of greater cross-section than the input beam,
    the pointing reflector, input reflectors and concave reflector being adapted to rotate about the input axis to substantially maintain the relative angle between the input and output axes.

4. The beam expansion and pointing system of claim 3, the input reflectors comprising three reflectors positioned outside the envelope of the output beam from the pointing reflector, the first reflector being positioned in the input beam path, the second reflector directing the input beam reflected from the first reflector onto the third reflector, and the third reflector being convex to apply an angular divergence to the input beam and positioned to reflect the beam onto the pointing reflector.

5. The beam expansion and pointing system of claim 4, wherein the first and second input reflectors are positioned generally on opposite sides of said predetermined incident axis from the third input reflector.

6. The beam expansion and pointing system of claim 4, wherein the angular orientation of the second input reflector is adjustable.

7. The beam expansion and pointing system of claim 4, wherein the pointing reflector and second input reflector are positioned generally on opposite sides of the input axis from the concave and third reflector.

8. The beam expansion and pointing system of claim 3, wherein the pointing reflector and concave reflector are positioned generally on opposite sides of the input axis.

9. The beam expansion and pointing system of claim 3, wherein the pointing reflector comprises a substantially plano mirror.

10. A method of expanding and pointing an input beam along an output axis at a predetermined angle to the input beam axis, comprising:
  causing the input beam to angularly diverge and thereby expand its cross-section,
  directing the expanding beam onto a reflective surface along an axis other than the input axis, and
  applying a collimation to the expanding beam reflected off the reflective surface and redirecting it back to the reflective surface along an incident axis, the incident axis being selected so that the collimated beam is reflected off the reflective surface along a desired output axis at a predetermined angle to the input beam axis and with a cross-section greater than the cross-section of the input beam.

11. The method of claim 10, wherein the expanding beam is substantially completely collimated between being initially reflected off the reflective surface and redirected back to the reflective surface.

12. The method of claim 10, further comprising the step of rotating the beam path about the input beam axis.

* * * * *